United States Patent
Shibata

(10) Patent No.: US 11,397,315 B2
(45) Date of Patent: Jul. 26, 2022

(54) ELECTROWETTING DEVICE AND METHOD FOR MANUFACTURING ELECTROWETTING DEVICE

(71) Applicant: Sharp Kabushiki Kaisha, Sakai (JP)

(72) Inventor: Akihiko Shibata, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 270 days.

(21) Appl. No.: 16/775,235

(22) Filed: Jan. 28, 2020

(65) Prior Publication Data

US 2020/0241283 A1 Jul. 30, 2020

Related U.S. Application Data

(60) Provisional application No. 62/797,840, filed on Jan. 28, 2019.

(51) Int. Cl.
*G02B 26/00* (2006.01)

(52) U.S. Cl.
CPC ................ *G02B 26/005* (2013.01)

(58) Field of Classification Search
CPC ...... G02B 26/005; G02B 26/004; G02B 3/14; G02B 2207/115; G02B 26/02; G02B 30/27; G02B 1/06; G02B 21/0076; G02B 2207/117; G02B 3/12; G02B 5/201; G02B 5/24; G02B 26/002; G02B 26/007;
(Continued)

(56) References Cited

U.S. PATENT DOCUMENTS

2004/0178724 A1* 9/2004 Karasawa ........... H01L 51/5281
313/506
2011/0135266 A1* 6/2011 Fan ....................... G02B 6/3538
385/131
(Continued)

FOREIGN PATENT DOCUMENTS

JP          3045945 B2     5/2000
JP       2008-096836 A     4/2008
(Continued)

*Primary Examiner* — Brandi N Thomas
(74) *Attorney, Agent, or Firm* — ScienBiziP, P.C.

(57) ABSTRACT

An electrowetting device according to the present disclosure includes: an electrode substrate having a first substrate, a plurality of first electrodes formed on the first substrate, a dielectric layer formed on the plurality of first electrodes, and a first hydrophobic layer formed on the dielectric layer; a counter substrate disposed opposite the electrode substrate with a predetermined gap interposed therebetween, and having a second substrate, a second electrode formed on the second substrate, and a second hydrophobic layer formed on the second electrode; and a sealing member located in an outer peripheral region of the electrode substrate, and the sealing member attaching the electrode substrate and the counter substrate together. The gap between the first and second hydrophobic layers is defined by the sealing member, and a portion of the sealing member forms an injection hole to allow a droplet to be injected into the gap. An opening region of the outer peripheral region that includes the injection hole does not overlap the counter substrate as viewed from the normal direction of the counter substrate.

3 Claims, 9 Drawing Sheets

(58) Field of Classification Search
CPC ........ G02B 30/31; G02B 7/026; G02B 7/028; G02B 26/08; G02B 30/26; G02B 7/04; G02B 1/04; G02B 3/0012; G02B 6/003; G02B 6/0051; G02B 1/12; G02B 26/00; G02B 3/00; G02B 30/00; G02B 30/10; G02B 30/28; G02B 30/52; G02B 5/1895; G02F 1/167; G02F 1/1676; G02F 2201/44; G02F 1/16756; G02F 1/17; G02F 1/23; G02F 2001/1678; G02F 1/16762; G02F 1/1685; G02F 1/21; G02F 2202/32; G02F 2203/055; G02F 2203/09; G02F 2203/34; G02F 2203/62; G02F 1/133342; G02F 1/133602; G02F 1/133742; G02F 1/13394; G02F 1/134345; G02F 1/153; G02F 1/157; G02F 1/163; G02F 1/25; G02F 2203/02; G02F 1/133514; G02F 1/1337; G02F 1/133711; G02F 1/1339; G02F 1/134363; G02F 1/136286; G02F 1/1368; G02F 1/16755; G02F 1/1677; G02F 2202/42; G02F 1/1333; G02F 1/133305; G02F 1/1334; G02F 1/133512; G02F 1/133603; G02F 1/133615; G02F 1/133723; G02F 1/133734; G02F 1/133753; G02F 1/13378; G02F 1/13775; G02F 1/1681; G02F 2203/12; G02F 2203/66; G02F 1/0105; G02F 1/0113; G02F 1/0327; G02F 1/13306; G02F 1/133311; G02F 1/133368; G02F 1/1335; G02F 1/133502; G02F 1/133703; G02F 1/133761; G02F 1/133765; G02F 1/133788; G02F 1/13392; G02F 1/134309

See application file for complete search history.

(56) References Cited

U.S. PATENT DOCUMENTS

2013/0342970 A1* 12/2013 Franklin ............... G06F 1/1656
　　　　　　　　　　　　　　　　　　　　　　361/679.01
2015/0241689 A1* 8/2015 Sakai ..................... G02B 5/201
　　　　　　　　　　　　　　　　　　　　　　359/290

FOREIGN PATENT DOCUMENTS

WO　　2017078059 A1　　5/2017
WO　　2017126374 A1　　7/2017

* cited by examiner

ELECTROWETTING DEVICE AND METHOD FOR MANUFACTURING ELECTROWETTING DEVICE

BACKGROUND

1. Technical Field

The present invention relates to electrowetting devices and manufacturing methods for electrowetting devices.

2. Description of the Related Art

Electrowetting devices (also called microfluidic devices or droplet devices) have in recent years been developed. Electrowetting refers to the phenomenon that when an electric field is applied to a droplet disposed on a hydrophobic electrode provided on a dielectric layer, the contact angle of the droplet with respect to the dielectric layer is changed. Electrowetting can allow manipulation of submicroliter-scale droplets, for example. Electrowetting devices are often called "electrowetting-on-dielectric devices (EWODs)," and therefore, are also hereinafter referred to as "EWODs" for the sake of simplicity.

International Publication WO2017/078059 discloses an electrowetting device including an upper substrate and a lower substrate. The upper substrate has injection holes through which a droplet is injected into a gap (space) formed between the upper and lower substrates. The upper and lower substrates are, for example, a glass substrate.

SUMMARY

The manufacture of such an electrowetting device including an upper substrate having injection holes requires a process of making holes in the substrate using a glass processing technique, such as mechanical machining (e.g., drilling), laser machining, or wet etching, leading to an increase in manufacturing cost. In addition, a crack may spread from a hole, which is a problem with quality. Therefore, there is a demand for improvement of the quality of electrowetting devices and reduction of the manufacturing cost of electrowetting devices.

With the above problem in mind, the present invention has been made. It is an object of the present invention to provide a manufacturing method for an electrowetting device that does not require a hole-making process.

An electrowetting device and manufacturing method therefor according to the following item are herein disclosed.

Item 1

An electrowetting device comprising:

an electrode substrate having a first substrate, a plurality of first electrodes formed on the first substrate, a dielectric layer formed on the plurality of first electrodes, and a first hydrophobic layer formed on the dielectric layer;

a counter substrate disposed opposite the electrode substrate with a predetermined gap interposed therebetween, and the counter substrate having a second substrate, a second electrode formed on the second substrate, and a second hydrophobic layer formed on the second electrode; and a sealing member located in an outer peripheral region of the electrode substrate, and the sealing member attaching the electrode substrate and the counter substrate together, wherein the gap between the first and second hydrophobic layers is defined by the sealing member, and a portion of the sealing member forms an injection hole to allow a droplet to be injected into the gap, and an opening region which is a portion of the outer peripheral region and includes the injection hole does not overlap the counter substrate as viewed from a normal direction of the counter substrate.

Item 2

The electrowetting device according to item 1, wherein the outer peripheral region includes a region where the first hydrophobic layer is not formed, and the sealing member is formed in the region.

Item 3

The electrowetting device according to item 1 or 2, wherein the sealing member is formed of a sealing material, and a portion of the sealing member located in the opening region is exposed.

Item 4

The electrowetting device according to item 1 or 2, wherein the sealing member is formed of an adhesive tape, and a portion of the sealing member located in the opening region is entirely or partially covered by a separation film.

Item 5

The electrowetting device according to any of items 1-4, wherein the plurality of first electrodes are arranged in a matrix of a plurality of rows and a plurality of columns, and the electrode substrate further has a plurality of TFTs coupled to the plurality of first electrodes.

Item 6

A method for manufacturing an electrowetting device comprising:

obtaining an electrode substrate by forming a plurality of first electrodes on a first substrate, forming a dielectric layer on the plurality of first electrodes, and forming a first hydrophobic layer on the dielectric layer;

obtaining a counter substrate by forming a second electrode on a second substrate, and forming a second hydrophobic layer on the second electrode;

drawing a pattern of a sealing material on at least one of the electrode substrate or the counter substrate to form an injection hole to inject a droplet into a gap formed between the first and second hydrophobic layers;

attaching the electrode substrate and the counter substrate together by the sealing material so that the electrode substrate is opposite the counter substrate; and cutting and removing a portion of the counter substrate covering the sealing material from the sealing material.

Item 7

The method according to item 6, wherein in the obtaining the electrode substrate, the first hydrophobic layer is formed on the dielectric layer in a first hydrophobic film pattern including a first slit having a first line width, in the obtaining the counter substrate, the second hydrophobic layer is formed on the second electrode in a second hydrophobic film pattern including a second slit having a second line width smaller than the first line width, in the drawing a pattern of the sealing material, a pattern of the sealing material is drawn along at least one of the first slit of the electrode substrate or the second slit of the counter substrate, in the attaching the electrode substrate and the counter substrate together, the electrode substrate and the counter substrate are attached together so that the first slits cover the second slits as viewed from a normal direction of the counter substrate, in the cutting and removing a portion of the counter substrate, a portion of the counter substrate is removed from the sealing material so that the injection hole is exposed.

Item 8

The method according to item 7, wherein
the second line width is 1/10 or less of the first line width.

Item 9

The method according to item 6, wherein in the obtaining the electrode substrate, the first hydrophobic layer is formed on the dielectric layer in a first hydrophobic film pattern including a first slit, in the drawing a pattern of the sealing material, an adhesive tape is applied to the electrode substrate along the first slit, and thereafter, a portion of the adhesive tape including the injection hole is covered with a separation film, in the attaching the electrode substrate and the counter substrate together, the electrode substrate and the counter substrate are attached together with the separation film interposed therebetween, and in the cutting and removing a portion of the counter substrate, a portion of the counter substrate is removed from the sealing material so that the separation film is exposed.

An illustrative embodiment of the present invention provides a method for manufacturing an electrowetting device without the need of a hole-making process, and an electrowetting device manufactured by the manufacturing method.

DETAILED DESCRIPTION

An electrowetting device according to a non-limiting illustrative embodiment of the present invention includes: an electrode substrate having a first substrate, a plurality of first electrodes formed on the first substrate, a dielectric layer formed on the plurality of first electrodes, and a first hydrophobic layer formed on the dielectric layer; a counter substrate disposed opposite the electrode substrate with a predetermined gap interposed therebetween, and the counter substrate having a second substrate, a second electrode formed on the second substrate, and a second hydrophobic layer formed on the second electrode; a sealing member for attaching the electrode substrate and the counter substrate together, the sealing member being disposed in an outer peripheral region of the electrode substrate. The gap between the first and second hydrophobic layers is defined by the sealing member. An injection hole for injecting a droplet into the gap is formed in a portion of the sealing member. As viewed from the normal direction of the counter substrate, an opening region that is a portion of the outer peripheral region and includes the injection hole does not overlap the counter substrate.

A typical example electrowetting device is an active-matrix electrowetting device. In the description that follows, an active-matrix electrowetting device (AM-EWOD) as illustrated. The electrowetting device according to an embodiment of the present invention is not limited to that illustrated herein.

The electrode substrate is typically an active-matrix substrate having a plurality of thin-film transistors (TFTs). The active-matrix substrate (or the electrode substrate) is hereinafter referred to as a "TFT substrate." The terms "sealing material" and "sealing member" (the sealing member is formed of the sealing material) may be used herein interchangeably. While the term "sealing member" is mainly used for describing the structure of a device, the term "sealing material" is mainly used for describing a method for manufacturing a device.

Embodiments of the present invention will now be described with reference to the accompanying drawings. To avoid unnecessarily obscuring the present disclosure, well-known features may not be described or substantially the same elements may not be redundantly described, for example. This is for ease of understanding the present disclosure. The present inventor provides the accompanying drawings and the following description to allow a person skilled in the art to thoroughly understand the present disclosure. These are not intended to limit the subject matter as set forth in the appended claims. In the description that follows, like elements are indicated by like reference signs.

First Embodiment

1. Structure of AM-EWOD 100

An AM-EWOD 100 according to this embodiment will be described with reference to FIGS. 1-4.

Figure 1:
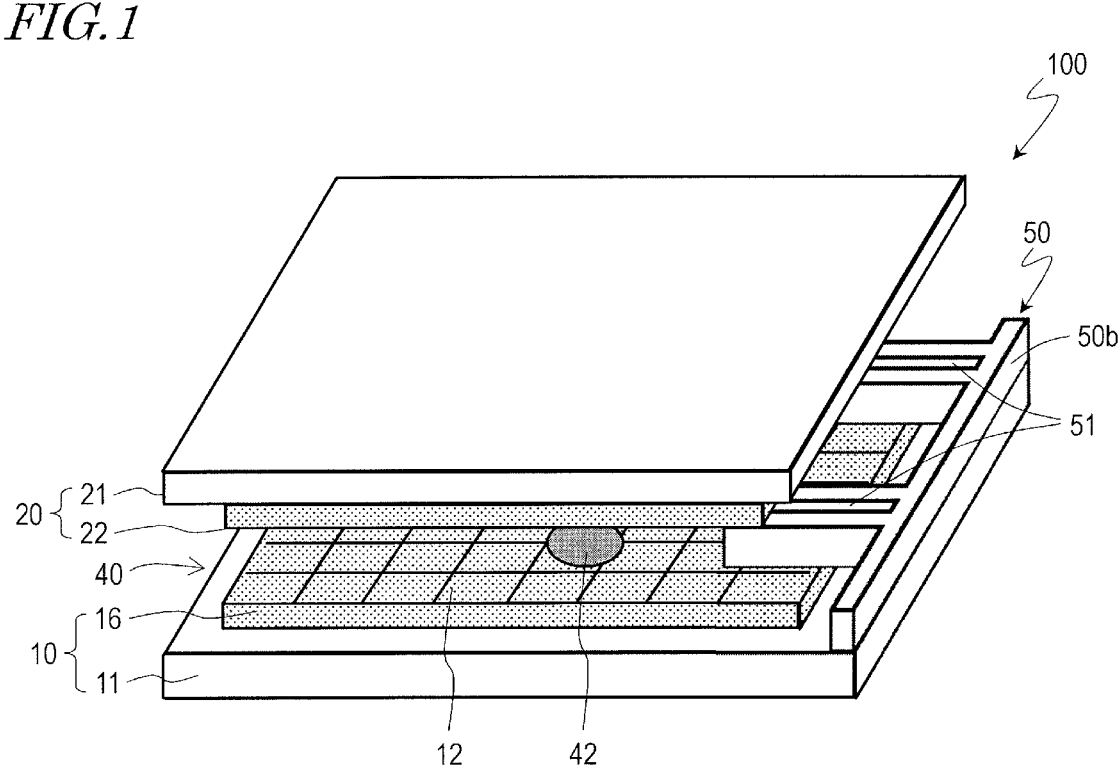
FIG. 1 is a perspective view schematically showing an overall configuration of an AM-EWOD 100 according to a first embodiment.
Figure 2:
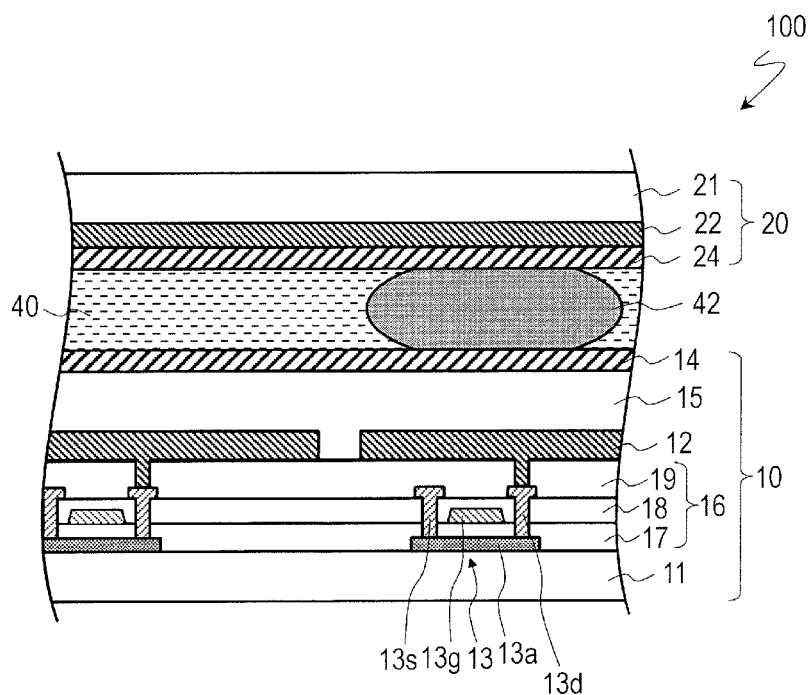
FIG. 2 is a schematic cross-sectional view mainly showing an internal cross-sectional structure of the AM-EWOD 100.
Figure 3:
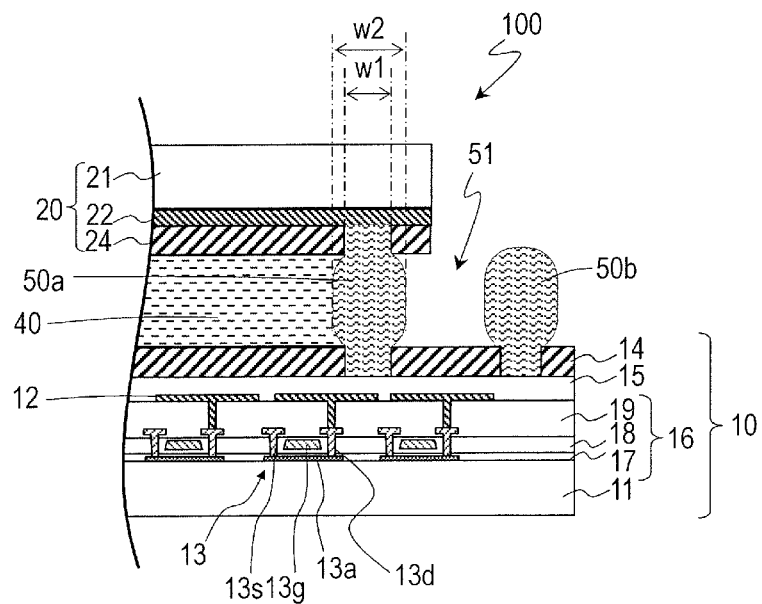
FIG. 3 is a schematic cross-sectional view mainly showing a cross-sectional structure of a portion of the AM-EWOD 100 including an outer peripheral region 60 of a TFT substrate 10.
Figure 4:
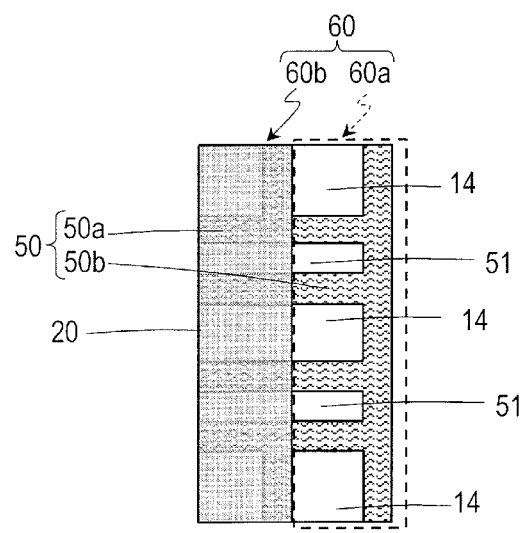
FIG. 4 is a schematic plan view mainly showing the outer peripheral region 60 of the TFT substrate 10 as viewed from the normal direction of a counter substrate 20.

FIG. 1 is a perspective view schematically showing an overall configuration of the AM-EWOD 100. FIG. 2 is a schematic cross-sectional view mainly showing an internal cross-sectional structure of the AM-EWOD 100. FIG. 3 is a schematic cross-sectional view mainly showing a cross-sectional structure of a portion of the AM-EWOD 100 including an outer peripheral region 60 of a TFT substrate 10. FIG. 4 is a schematic plan view mainly showing the outer peripheral region 60 of the TFT substrate 10 as viewed from the normal direction of a counter substrate 20.

As shown in FIGS. 1 and 2, the AM-EWOD 100 includes a TFT substrate 10 and a counter substrate 20. The counter substrate 20 is disposed opposite the TFT substrate 10 with a predetermined gap 40 interposed therebetween.

The TFT substrate 10 has a substrate 11, a plurality of first electrodes 12, a plurality of TFTs 13, a first hydrophobic layer 14, and a dielectric layer 15. The substrate 11 is, for example, a glass substrate.

The plurality of first electrodes 12 are provided on the substrate 11 (i.e., the plurality of first electrodes 12 are supported by the substrate 11). The plurality of first electrodes 12 are arranged in a matrix of a plurality of rows and a plurality of columns. The plurality of first electrodes 12 are coupled to a thin-film electronic circuit (TFT circuit) 16 including the plurality of TFTs 13. A voltage is independently applied to each first electrode 12. The plurality of first electrodes 12 are each hereinafter referred to as a "unit electrode." The unit electrodes 12 are formed of, for example, ITO.

The plurality of TFTs 13 are coupled to the plurality of unit electrodes 12, respectively (i.e., the plurality of TFTs 13 are each coupled to a corresponding one of the plurality of unit electrodes 12). Each TFT 13 has a semiconductor layer 13*a*, a gate electrode 13*g*, a source electrode 13*s*, and a drain electrode 13*d*. As a material for the semiconductor layer 13*a*, various known semiconductor materials can be used. Although FIG. 2 illustrates the TFT 13 having the top-gate structure, each TFT 13 may be a TFT having the bottom-gate structure.

The semiconductor layer 13*a* is formed on the substrate 11. A gate insulating layer 17 is formed to cover the semiconductor layer 13*a*. The gate insulating layer 17 is, for example, a SiN layer, $SiO_2$ layer, or SiN layer/$SiO_2$ layer (multilayer structure). The gate electrode 13*g* is formed on the gate insulating layer 17. An interlayer insulating layer 18 is formed to cover the gate electrode 13*g*. The interlayer insulating layer 18 is, for example, a SiN layer, $SiO_2$ layer, or SiN layer/$SiO_2$ layer (multilayer structure). The source electrode 13*s* and the drain electrode 13*d* are formed on the interlayer insulating layer 18. The source electrode 13*s* and the drain electrode 13*d* are coupled to the semiconductor layer 13*a* in contact holes formed in the gate insulating layer 17 and the interlayer insulating layer 18.

An interlayer insulating layer 19 is formed to cover the TFT 13. The interlayer insulating layer 19 is formed of, for example, a photosensitive resin material. The unit electrode 12 is formed on the interlayer insulating layer 19. The unit electrode 12 is coupled to the drain electrode 13*d* in a contact hole formed in the interlayer insulating layer 19.

The dielectric layer 15 is provided on the plurality of unit electrodes 12. The first hydrophobic layer 14 is provided on the plurality of unit electrodes 12 with the dielectric layer 15 interposed therebetween. In other words, the dielectric layer 15 is provided between the unit electrodes 12 and the first hydrophobic layer 14. The dielectric layer 15 is, for example, a SiN layer of 100-500 nm. The first hydrophobic layer 14 is, for example, a fluoropolymer layer having a thickness of 30-100 nm.

The counter substrate 20 has a substrate 21, a second electrode 22, and a second hydrophobic layer 24. The substrate 21 is, for example, a glass substrate.

The second electrode 22 is provided on the substrate 21 (i.e., the second electrode 22 is supported by the substrate 21). The second electrode 22 is disposed opposite the plurality of unit electrodes 12. The second electrode 22 is hereinafter referred to as a "counter electrode." The counter electrode 22 is formed of, for example, ITO. The counter electrode 22 has a thickness of, for example, 50-150 nm. The second hydrophobic layer 24 is provided on the counter electrode 22. The second hydrophobic layer 24 is, for example, a fluoropolymer layer having a thickness of 30-100 nm.

A droplet 42 is disposed in a gap (flow path) 40 formed between the TFT substrate 10 and the counter substrate 20. There may be one or more droplets 42. The droplet 42 is injected through an injection hole 51 located in an outer peripheral region of the TFT substrate 10. The droplet 42 may be a conductive liquid, such as an ionic liquid or polar liquid. As the droplet 42, for example, water, electrolytic solutions (aqueous solutions of electrolytes), alcohols, and various ionic liquids can be used. Examples of such liquids include whole-blood samples, bacterial-cell suspensions, protein or antibody solutions, and various buffer solutions.

A nonconductive liquid that is immiscible with the droplet 42 may be injected into the gap 40. For example, the space of the gap 40 excluding the droplet 42 may be filled with the nonconductive liquid. The nonconductive liquid is injected through an injection hole 51 before the droplet 42 is injected. The nonconductive liquid may be a nonpolar liquid (non-ionic liquid) that has a surface tension smaller than that of the droplet 42. Examples of the nonconductive liquid include hydrocarbon solvents (low-molecular-weight hydrocarbon solvents) such as decane, dodecane, hexadecane, and undecane, oils such as silicone oils, and fluorocarbon solvents. An example of silicone oils is dimethyl polysiloxane. These nonconductive liquids may be used alone or in combination.

As the nonconductive liquid, a liquid having a specific gravity smaller than that of the droplet 42 is selected. The specific gravity of the droplet 42 and the specific gravity of the nonconductive liquid are not particularly limited, so long as the relationship, the specific gravity of the nonconductive liquid<the specific gravity of the droplet 42, is satisfied. For example, in the case where the droplet 42 is an aqueous solution of an electrolyte, the specific gravity of the droplet 42 is almost equal to that of water ($\approx 1.0$). As the nonconductive liquid, a liquid having a specific gravity of less than 1.0, such as a silicone oil, can be used, for example.

As shown in FIGS. 3 and 4, a sealing member 50 is formed in an outer peripheral region (peripheral edge) of the TFT substrate 10. FIG. 3 illustrates only a portion of the sealing member 50 including an injection hole 51. A region of the TFT substrate 10 where the sealing member 50 is located, and a region of the counter substrate 20 that is located opposite that region of the TFT substrate 10 with the gap 40 interposed therebetween, are collectively referred to as an "outer peripheral region 60." A portion of the TFT circuit 16 is also formed in the outer peripheral region 60 of the TFT substrate 10 below the first hydrophobic layer 14.

The sealing member 50, which is for attaching the TFT substrate 10 and the counter substrate 20 together, is formed of a sealing material. The sealing member 50 includes portions 50a and 50b. The portion 50a of the sealing member 50 defines the gap 40 between the first hydrophobic layer 14 and the second hydrophobic layer 24. The portion 50a is located in a region 60b of the outer peripheral region 60 where the TFT substrate 10 overlaps the counter substrate 20, as viewed from the normal direction of the counter substrate 20.

The outer peripheral region 60 includes an opening region 60a (a rectangular region surrounded by a dashed line in FIG. 4) where the TFT substrate 10 does not overlap the counter substrate 20 as viewed from the normal direction of the counter substrate 20. The counter substrate 20 is not present in the opening region 60a. Therefore, the portion 50b of the sealing member 50 located in the opening region 60a is exposed to the outside. The portion 50b forms an injection hole(s) 51. Thus, the opening region 60a includes a region where the exposed injection holes 51 are formed.

The sealing member 50 may be formed such that the portion 50a of the sealing member 50 supports the TFT substrate 10 and the counter substrate 20, and the portion 50b forms the injection holes 51. The shape of the entire sealing member 50 is not limited to that illustrated in the drawings. The number of injection holes 51 in the opening region 60a is not particularly limited. The number of injection holes 51 in the opening region 60a may be two as shown in the drawings, or alternatively, one or three or more.

The portions of the TFT substrate 10 and the counter substrate 20 on which the sealing member 50 is formed do not include a hydrophobic layer. Specifically, the outer peripheral region 60 of the TFT substrate 10 includes a region where the first hydrophobic layer 14 is not formed. In that region, the sealing member 50 is formed. The first hydrophobic layer 14 is not formed on a portion of the TFT substrate 10 to which the sealing member 50 adheres.

The first hydrophobic layer 14 of the TFT substrate 10 has a first hydrophobic film pattern in the outer peripheral region 60. The first hydrophobic film pattern refers to a shape of the first hydrophobic layer 14 as viewed from the normal direction of the counter substrate 20. The first hydrophobic film pattern includes first slits having a predetermined line width for drawing a pattern of a sealing material or applying a sealing material. The first slits are a hydrophobic film-free portion that does not have the hydrophobic film pattern. FIGS. 3 and 4 show that the sealing member 50 having a width w2 of approximately 2.0 mm is formed in the outer peripheral region 60 along the first slits having a line width w1 of approximately 1.0-2.0 mm, for example.

The outer peripheral region 60 of the counter substrate 20 includes a region where the second hydrophobic layer 24 is not formed. The sealing member 50 is formed in that region. The second hydrophobic layer 24 is not formed on a portion of the counter substrate 20 to which the sealing member 50 adheres. The second hydrophobic layer 24 has a second hydrophobic film pattern including second slits in the outer peripheral region 60. The second slits are a hydrophobic film-free portion as with the first slits. In the region 60b included in the outer peripheral region 60, the width of the second slits is equal to the width w1 of the first slits, and these slits cover each other as viewed from the normal direction of the counter substrate 20.

The TFT circuit 16 of the TFT substrate 10 supplies a desired voltage to the plurality of unit electrodes 12 and the counter electrode 22 according to a control signal supplied from an external drive circuit (not shown), and thereby moves the droplet 42, for example.

The principle of moving the droplet 42 by electrowetting will now be described with reference to FIGS. 5A-5C.

Figure 5A:
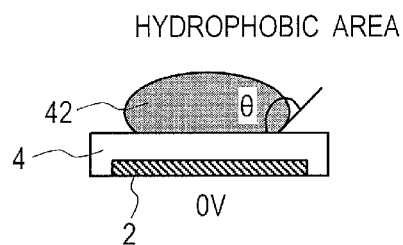
FIG. 5A is a schematic diagram for describing the principle of moving a droplet 42 by electrowetting.
Figure 5B:
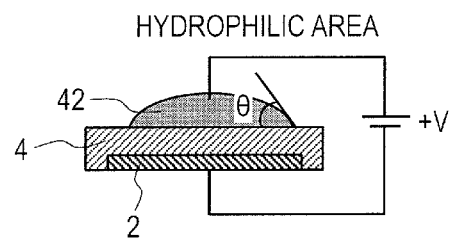
FIG. 5B is a schematic diagram for describing the principle of moving a droplet 42 by electrowetting.
Figure 5C:
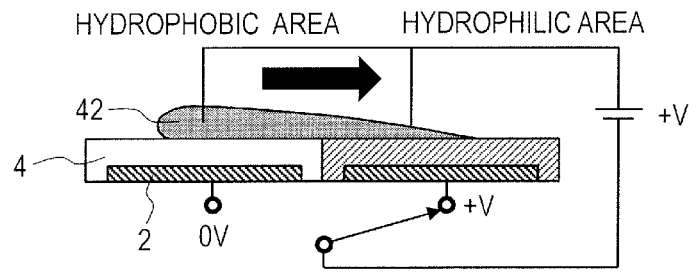
FIG. 5C is a schematic diagram for describing the principle of moving a droplet 42 by electrowetting.

FIGS. 5A-5C are schematic diagrams for describing the principle of moving the droplet 42 by electrowetting.

As described above, electrowetting refers to the phenomenon that when an electric field is applied to a droplet 42 disposed on a hydrophobic dielectric layer (hydrophobic layer) 4 provided on an electrode 2, the contact angle $\theta$ of the droplet 42 with respect to the dielectric layer 4 is changed. Therefore, as shown in FIG. 5A, a region on the electrode 2 can be caused to be hydrophobic ($\theta>90°$) (hereinafter referred to as a "hydrophobic area") in the absence of an applied voltage, and as shown in FIG. 5B, the region on the electrode 2 can be caused to be hydrophilic ($\theta<90°$) (hereinafter referred to as a "hydrophilic area") in the presence of a predetermined voltage applied (+V). Therefore, as shown in FIG. 5C, in the case where a hydrophobic area and a hydrophilic area are adjacent to each other, a droplet 42 located in the hydrophobic area is moved to the hydrophilic area. By repeated performing this operation, the droplet 42 can be freely moved on an active region.

2. Manufacturing Method for AM-EWOD 100

An example manufacturing method for the AM-EWOD 100 according to this embodiment will be described. Note that the TFT circuit 16 is not limited to that illustrated below, and may be a known TFT circuit.

The manufacturing method according to this embodiment includes a step of obtaining the TFT substrate 10, a step of obtaining the counter substrate 20, a step of drawing a pattern of a sealing material, a step of attaching the substrates together, and a step of uncovering the injection holes 51.

The step of obtaining the TFT substrate 10 includes forming the plurality of unit electrodes 12 on the TFT substrate 10, forming the dielectric layer 15 on the plurality of unit electrodes 12, and forming the first hydrophobic layer 14 on the dielectric layer 15, to obtain the TFT substrate 10.

The step of obtaining the counter substrate 20 includes forming the counter electrode 22 on the counter substrate 20, and forming the second hydrophobic layer 24 on the counter electrode 22, to obtain the counter substrate 20.

The step of drawing a pattern of a sealing material includes drawing a pattern of a sealing material on at least one of the TFT substrate 10 or the counter substrate 20 so as to form the injection holes 51 for injecting a droplet 42 into the gap 40 formed between the first hydrophobic layer 14 and the second hydrophobic layer 24.

The step of attaching the substrates together includes attaching the TFT substrate 10 and the counter substrate 20 together using the sealing material so that the first hydrophobic layer 14 and the second hydrophobic layer 24 are opposite each other.

The step of uncovering the injection holes 51 includes cutting and removing a portion of the counter substrate 20 covering the sealing material from the sealing material so that the portion 50b of the sealing member 50 and the injection holes 51 are exposed.

Each step of the example method for manufacturing the AM-EWOD 100 according to this embodiment will be described in greater detail with reference to FIGS. 6A-8D.

FIGS. 6A-6G are schematic cross-sectional views showing an example method for manufacturing the TFT substrate 10 included in the AM-EWOD 100.

Figure 6A:
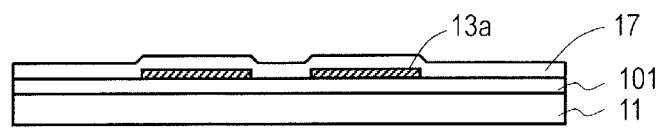
FIG. 6A is a schematic cross-sectional view showing an example method for manufacturing the TFT substrate 10 included in the AM-EWOD 100.

Initially, as shown in FIG. 6A, for example, an optional buffer layer 101 is formed on the glass substrate 11. The buffer layer 101 may, for example, be a single layer selected from the group consisting of a SiN layer, $SiO_2$ layer, and SiON layer, or a multilayer structure including two or more thereof. The buffer layer 101 has a thickness of, for example, 100-300 nm.

For example, an amorphous silicon film having a thickness of approximately 20-100 nm is formed on the buffer layer 101, and thereafter, the amorphous silicon film is crystallized, to obtain a polysilicon film. The polysilicon film is patterned using a photolithographic process to obtain the semiconductor layer 13a. The semiconductor layer 13a may be preferably formed of, for example, continuous grain silicon (CGS).

The gate insulating layer 17 is formed on the semiconductor layer 13a. The gate insulating layer 17 is, for example, a SiN layer, $SiO_2$ layer, or SiN layer/$SiO_2$ layer (multilayer structure), and has a thickness of, for example, approximately 50-200 nm.

Figure 6B:
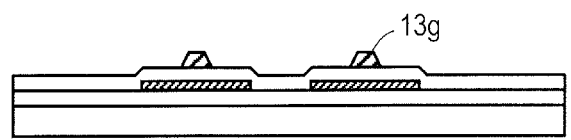
FIG. 6B is a schematic cross-sectional view showing an example method for manufacturing the TFT substrate 10 included in the AM-EWOD 100.

Next, as shown in FIG. 6B, the gate electrode 13g is formed on the gate insulating layer 17. The gate electrode 13g is formed by, for example, patterning a metal layer formed of W, Mo, Al, or the like using a photolithographic process. The gate electrode 13g has a thickness of, for example, 100-400 nm. In order to enhance adhesive properties and improve contact resistance, a multilayer structure or alloy layer of W/Ta, MoW, Ti/Al, Ti/Al/Ti, Al/Ti, or the like may be used.

Figure 6C:
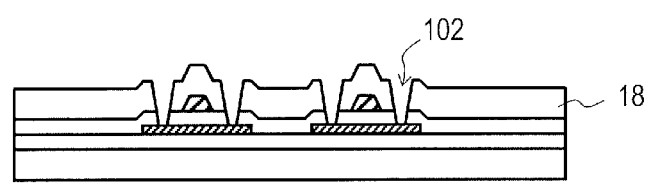
FIG. 6C is a schematic cross-sectional view showing an example method for manufacturing the TFT substrate 10 included in the AM-EWOD 100.

Next, as shown in FIG. 6C, the interlayer insulating layer 18 is formed. The interlayer insulating layer 18 may be a SiN layer, $SiO_2$ layer, or SiON layer, or a multilayer structure thereof. The interlayer insulating layer 18 has a thickness of, for example, 500-900 nm. The contact holes 102 are formed by patterning using a photolithographic process.

Figure 6D:
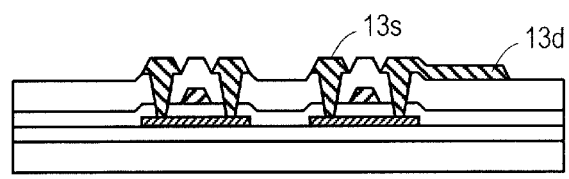
FIG. 6D is a schematic cross-sectional view showing an example method for manufacturing the TFT substrate 10 included in the AM-EWOD 100.

Next, as shown in FIG. 6D, the source electrodes 13s and the drain electrodes 13d are formed. The source electrodes 13s and the drain electrodes 13d are formed by, for example, patterning a metal layer of Al, Mo, or the like using a photolithographic process. The source electrodes 13s and the drain electrodes 13d have a thickness of, for example, 200-400 nm. In order to enhance adhesive properties and improve contact resistance, a multilayer structure or alloy layer of Ti/Al, Ti/Al/Ti, Al/Ti, TiN/Al/TiN, Mo/Al, Mo/Al/Mo, Mo/AlNd/Mo, MoN/Al/MoN, or the like may be used.

Thus, the TFTs coupled to the unit electrodes 12 are fabricated. Optionally, TFTs included in a gate driver and/or source driver may be fabricated together with the above TFTs. The TFTs 13 are not limited to the above example, and may be fabricated using known materials and manufacturing techniques.

Figure 6E:
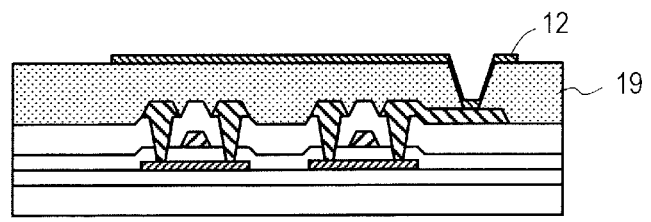
FIG. 6E is a schematic cross-sectional view showing an example method for manufacturing the TFT substrate 10 included in the AM-EWOD 100.

Next, as shown in FIG. 6E, the interlayer insulating layer 19 is formed. The interlayer insulating layer 19 is formed by a photolithographic process using a photosensitive resin. The plurality of unit electrodes 12 are formed on the interlayer insulating layer 19. The unit electrodes 12 is formed by forming an InZnO film having a thickness of 50-150 nm using a sputtering technique, and thereafter, patterning the InZnO film using a photolithographic process. At this time, in order to form an amorphous InZnO film, the film formation is preferably performed at a temperature of 300° C. or lower, more preferably 250° C. or lower. For example, X-ray diffraction (XRD) can be used to check whether or not a desired amorphous InZnO film has been formed.

Figure 6F:
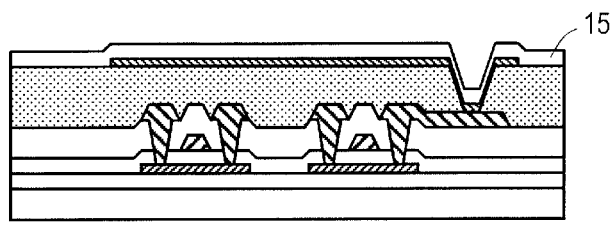
FIG. 6F is a schematic cross-sectional view showing an example method for manufacturing the TFT substrate 10 included in the AM-EWOD 100.

Next, as shown in FIG. 6F, the dielectric layer 15 is formed. The dielectric layer 15 is formed of a SiN layer. The hydrogen content of the SiN layer can be controlled using any known suitable technique, e.g., by controlling the concentration of ammonia in a plasma CVD technique using silane, ammonia, and nitrogen as raw materials (see, for example, Japanese Patent No. 3045945).

Although not shown, an opening through which a terminal portion and the like are exposed is formed by patterning the SiN layer using a photolithographic process.

Figure 6G:
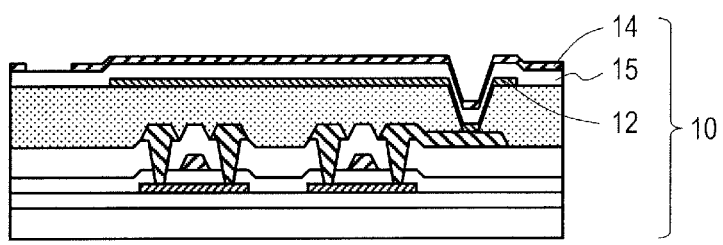
FIG. 6G is a schematic cross-sectional view showing an example method for manufacturing the TFT substrate 10 included in the AM-EWOD 100.

Next, as shown in FIG. 6G, the first hydrophobic layer 14 is formed. The first hydrophobic layer 14 is, for example, a fluoropolymer layer having a thickness of 30-100 nm. The fluoropolymer is preferably chemically bound to the surface of an oxide conductive layer, and preferably has a functional group at a terminal thereof, for example. Examples of the terminal functional group include —Si—$(OR)_n$, —NH—Si—$(OR)_n$, —CO—NH—Si—$(OR)_n$, and —COOH (n is 1-3). A silane coupling agent or fluorinated primer may be used in conjunction with the fluoropolymer. As the fluoropolymer, for example, CYTOP (registered trademark), manufactured by Asahi Glass Co., Ltd, can be preferably used.

The fluoropolymer layer is formed by a known technique using a fluoropolymer solution (including a fluorinated solvent). In order to remove the solvent and/or improve the stability of the fluoropolymer, a thermal treatment is preferably performed at approximately 170-200° C., for example. Prior to the formation of the fluoropolymer layer, a silane coupling agent treatment or fluorinated primer treatment may be performed.

Figure 7:
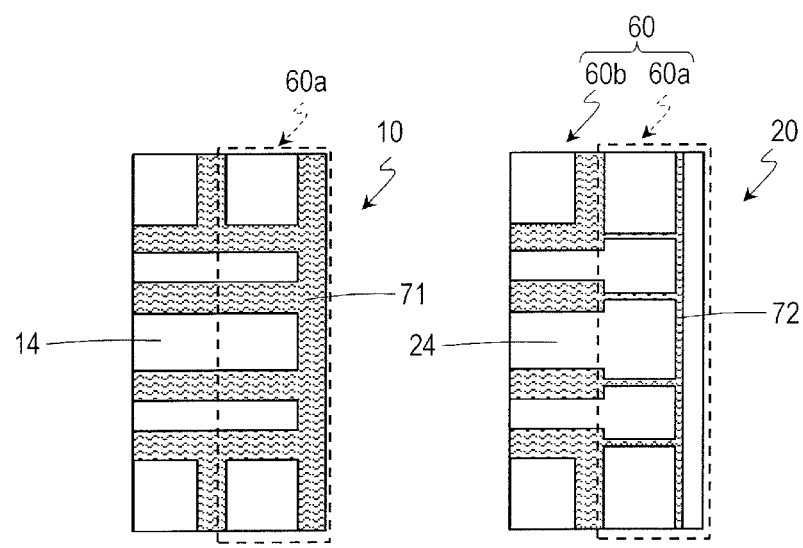
FIG. 7 is a schematic diagram illustrating a first hydrophobic film pattern of the TFT substrate 10 and a second hydrophobic film pattern of the counter substrate 20.

FIG. 7 is a schematic diagram illustrating a first hydrophobic film pattern of the TFT substrate 10 and a second hydrophobic film pattern of the counter substrate 20.

As described above, the first hydrophobic layer 14 is not formed in a portion of the outer peripheral region 60 in which the sealing member 50 is formed or a terminal portion (not shown). On the dielectric layer 15, the first hydrophobic layer 14 is formed in a first hydrophobic film pattern including first slits 71 having a first line width. The first line width is, for example, approximately 1.0-2.0 mm.

For example, after a fluoropolymer film is formed on an entire surface of the TFT substrate 10, the first slits 71 are formed, using a photolithographic process, in a portion of the outer peripheral region 60 in which a pattern of a sealing material is to be drawn. Specifically, the first slits 71 are formed by patterning so that injection holes can be formed when a pattern of a sealing material is drawn along the first slits 71 as described below. On the TFT substrate 10, the first slits 71 have substantially a uniform line width in the entire outer peripheral region 60.

Thus, the TFT substrate 10 is obtained. Note that in the above process, a lift-off process can be employed, as appropriate, instead of a photolithographic process.

Figure 8A:
FIG. 8A is a schematic cross-sectional view illustrating an example method for manufacturing the counter substrate 20 included in the AM-EWOD 100.
Figure 8B:
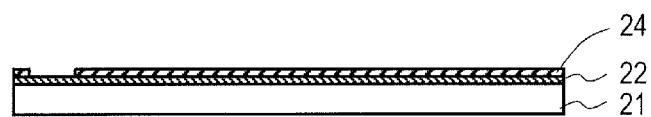
FIG. 8B is a schematic cross-sectional view illustrating an example method for manufacturing the counter substrate 20 included in the AM-EWOD 100.

Reference is made to FIGS. 8A-8D. FIGS. 8A and 8B are schematic cross-sectional views illustrating an example method for manufacturing the counter substrate 20 included in the AM-EWOD 100.

As shown in FIG. 8A, for example, the counter electrode 22 is formed on the glass substrate 21. The counter electrode 22 is formed on substantially an entire surface of the glass substrate 21. The counter electrode 22 is formed of a transparent oxide conductive layer, such as an ITO layer, InZnO layer, or ZnO layer. The counter electrode 22, which has a thickness of, for example, 50-150 nm, is formed by a sputtering technique.

Next, as shown in FIG. 8B, the second hydrophobic layer 24 is formed. The second hydrophobic layer 24 is not formed on the counter substrate 20 in a portion of the outer peripheral region 60 in which the sealing member 50 is to be formed (see FIG. 7), or a terminal portion (not shown), as with the TFT substrate 10. On the counter electrode 22, the second hydrophobic layer 24 is formed in a second hydrophobic film pattern including second slits 72 having a second line width smaller than the first line width. The second line width is preferably 1/10 or less of the first line width, e.g., 0.1 mm or less.

Reference is made back to FIG. 7. For example, as with the TFT substrate 10, after a fluoropolymer film is formed on an entire surface of the counter substrate 20, the second slits 72 are formed, using a photolithographic process, in a portion that is to adhere to a pattern of a sealing material drawn on the TFT substrate 10. More specifically, the second slits 72 having the second line width are formed in the opening region 60a of the outer peripheral region 60, and the second slits 72 having the same line width as that of the first slits 71 are formed in the region 60b of the TFT substrate 10, which is other than the opening region 60a. In this case, the second slits 72 are formed by patterning so that the second slits 72 can adhere to a pattern of a sealing material drawn along the first slits 71 when the TFT substrate 10 and the counter substrate 20 are attached to each other.

Next, a pattern of a sealing material is drawn on at least one of the TFT substrate 10 or the counter substrate 20 such that the injection holes 51 are formed. More specifically, a pattern of a sealing material is applied along at least the first slits 71 of the TFT substrate 10 or the second slits 72 of the counter substrate 20. A pattern of a sealing material does not necessarily need to be drawn on both of the substrates. For example, a pattern of a sealing material may be drawn along the first slits 71 of the TFT substrate 10 using a dispenser to form the injection holes 51. The sealing material may, for example, be a thermosetting resin (epoxy resin) mixed with a spacer (e.g., glass beads or plastic beads having a diameter of 100-300 μm).

Figure 8C:
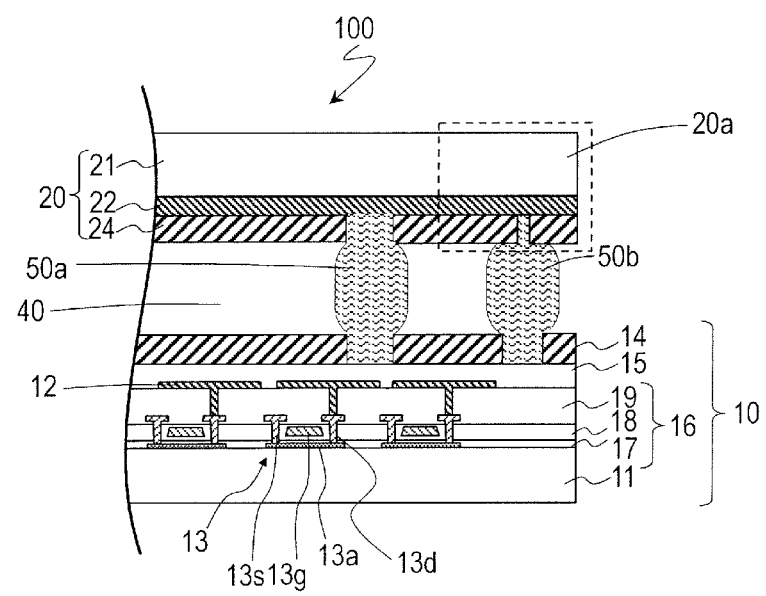
FIG. 8C is a schematic diagram for describing a step of attaching the TFT substrate 10 and the counter substrate 20 together.
Figure 8D:
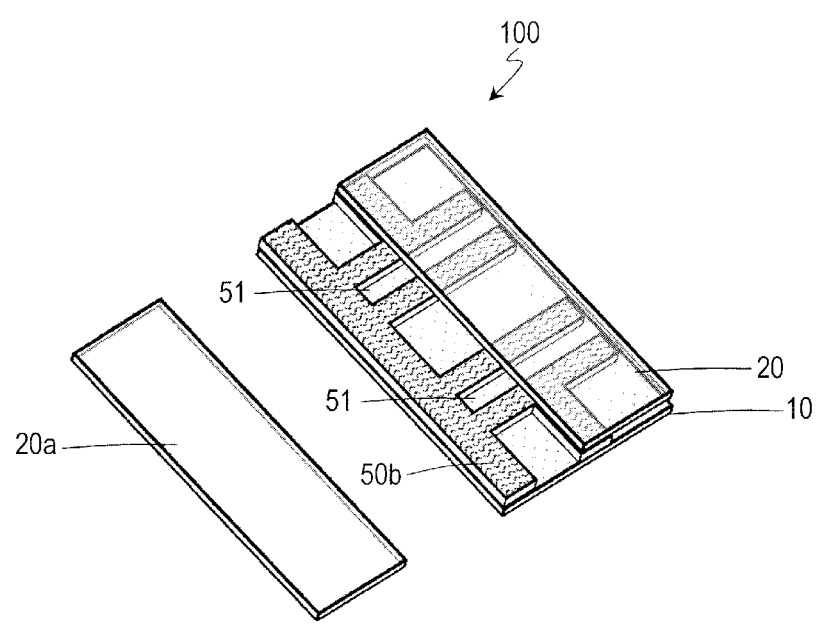
FIG. 8D is a schematic diagram for describing a state in which a portion of the counter substrate 20 is cut and removed from the sealing material so that injection holes 51 are exposed.

FIG. 8C is a schematic diagram for describing the step of attaching the TFT substrate 10 and the counter substrate 20 together. FIG. 8D is a schematic diagram for describing a state in which a portion of the counter substrate 20 is cut and removed from the sealing material so that the injection holes 51 are exposed.

As shown in FIG. 8C, the TFT substrate 10 and the counter substrate 20 are attached together with a pattern of a sealing material drawn on the TFT substrate 10 interposed therebetween so that the first hydrophobic layer 14 is opposite the second hydrophobic layer 24. The sealing material is cured by, for example, heating. At this time, the substrates are attached together so that the first slits 71 cover the second slits 72 as viewed from the normal direction of the counter substrate 20. As a result, the first hydrophobic layer 14 and the second hydrophobic layer 24 are opposite each other, and the gap 40 is formed therebetween. Note that in this attaching step, a transfer (transfer electrode) for coupling the counter electrode 22 to a terminal on the TFT substrate 10 is formed of, for example, a conductive paste.

Next, a portion of the counter substrate 20 covering the sealing material is cut and removed from the sealing material 50b so that the injection holes 51 are exposed. A portion 20a of the counter substrate 20 surrounding by a dashed line in FIG. 8C is cut and removed from the sealing material 50b. As a result, as shown in FIG. 8D, the injection holes 51 are exposed to the outside.

In the case where the second slits 72 having a wider line width, e.g., the same line width as the first line width of the first slits 71 of the TFT substrate 10, are formed in the opening region 60a of the counter substrate 20, the sealing material 50b (e.g., a thermosetting resin), when cured, more firmly adheres to the counter substrate 20. As a result, the portion 20a of the counter substrate 20 cannot be removed from the sealing material 50b even when cut, and therefore, it is difficult to form the injection holes 51. In contrast to this, according to this embodiment, the second line width of the second slits 72 is smaller than the first line width of the first slit 71. As a result, the area where the sealing material 50b adheres to the counter substrate 20 is reduced, and therefore, the adhesive strength of the sealing material 50b is reduced. This allows the portion 20a of the counter substrate 20 to be cut and removed from the sealing material 50b so that the injection holes 51 are formed.

According to the above manufacturing method, it is not necessary to dice or cingulate each of the TFT substrate 10 and the counter substrate 20 into individual device (or module) units and attach the units together. Instead, the two large-sized substrates (or mother substrates) that have been processed are attached together before singulation into individual device units. In addition, by removing a portion of the counter substrate 20 from the sealing material in the final step of manufacture, contaminants that would otherwise have entered through the injection holes 51 in steps performed before the final step can be appropriately eliminated. Furthermore, a drilling process is not required, and therefore, the quality (e.g., cracks) of an electrowetting device can be improved, and the manufacturing cost can be reduced.

Second Embodiment

An AM-EWOD 100 according to this embodiment is different from the AM-EWOD 100 of the first embodiment in that the sealing member 50 is formed of an adhesive tape. Differences in structure and manufacturing method between the AM-EWODs 100 of the first and second embodiments will now be mainly described, and features common to the first and second embodiments will not be described.

In some applications of an AM-EWOD, a peel strength similar to that of a liquid crystal cell may be required. In that case, for example, as the sealing material, an adhesive tape or tape-shaped adhesive agent having high adhesive strength may be used. However, the adhesive tape adheres to a hydrophobic layer, which makes it difficult to attach the TFT substrate 10 and the counter substrate 20 together at once. As used herein, the term "sealing material" is interpreted in broader sense, including a thermosetting resin, photocurable resin, adhesive tape, and tape-shaped adhesive agent. As used herein, the term "draw" with respect to a pattern of a sealing material" means a process of applying a sealing material to a substrate so that the sealing material forms a predetermined pattern, including, for example, a process of applying an adhesive tape having a predetermined pattern to a substrate.

The large-sized substrates that have been processed are initially singulated to obtain device units of each of the TFT substrate and the counter substrate, and thereafter, the TFT substrate and the counter substrate are attached together using, for example, an adhesive tape, whereby an AM-EWOD can be fabricated. However, in the case of an AM-EWOD obtained by such a manufacturing method, the adhesive layer of the adhesive tape is exposed in the opening region, and therefore, contaminants, etc., are likely to adhere to the adhesive layer during, for example, handling of the product.

The manufacturing method of this embodiment includes a step of obtaining the TFT substrate 10, a step of obtaining the counter substrate 20, a step of drawing a pattern of a sealing material, a step of attaching the TFT substrate 10 and the counter substrate 20 together, and a step of cutting a portion of the counter substrate 20. According to the AM-EWOD fabricated using this manufacturing method, contaminants, etc., can be substantially prevented from adhering to the adhesive layer during, for example, handling of the product.

The step of obtaining the TFT substrate 10 is as described in the first embodiment.

In the step of obtaining the counter substrate 20, it is not particularly necessary to form, on the counter electrode 22, the second hydrophobic layer 24 having a second hydrophobic film pattern including second slits 72 a second line width smaller than the first line width. Instead, the second hydrophobic layer 24 may be formed in a hydrophobic film pattern including slits having substantially a uniform line width on the entire outer peripheral region 60, like the TFT substrate 10.

Figure 9A:
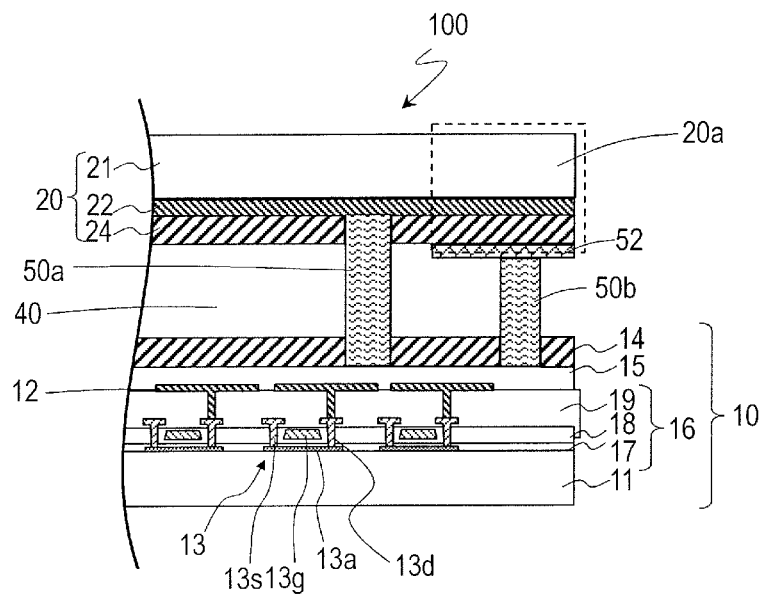
FIG. 9A is a schematic diagram showing a state in which the TFT substrate 10 and the counter substrate 20 are attached together.
Figure 9B:
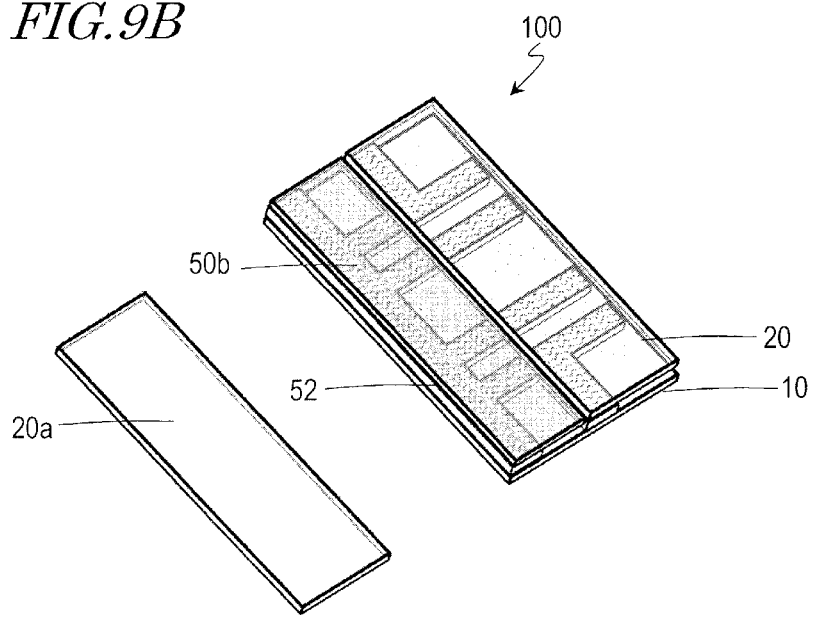
FIG. 9B is a schematic diagram showing a state in which a portion of the counter substrate 20 is cut and removed from a sealing material so that a separation film 52 is exposed.

FIG. 9A is a schematic diagram showing a state in which the TFT substrate 10 and the counter substrate 20 are attached together. FIG. 9B is a schematic diagram showing a state in which a portion 20a of the counter substrate 20 is cut and removed from the sealing material 50b so that a separation film 52 is exposed. The separation film has a surface coated with silicone or the like, and is therefore releasable from an adhesive agent. The separation film is also referred to as a "release film."

In the step of drawing a pattern of a sealing material, an adhesive tape is applied along the first slits 71 of the TFT substrate 10, and thereafter, the separation film 52 is placed on an adhesive layer of a portion of the adhesive tape including the injection holes 51. In other words, a portion of the sealing material 50 is covered by the separation film 52. At this time, in the opening region 60a, the entire adhesive tape forming the sealing member 50b including the injection holes 51 is preferably covered by the separation film 52. As a result, contaminants can be effectively prevented from adhering to the adhesive layer and entering from the injection holes 51.

In the attachment step, the TFT substrate 10 and the counter substrate 20 are attached together with the separation film 52 interposed therebetween.

In the step of cutting a portion of the counter substrate 20, the cut portion 20a of the counter substrate 20 is removed from the adhesive tape so that the separation film 52 covering the injection holes 51 is exposed. The separation film 52 is left in the opening region 60a without being removed. Because the separation film 52 is present between the adhesive tape and the counter substrate 20, the adhesive layer can be substantially prevented from adhering to the counter substrate 20. This allows the cut portion 20a of the counter substrate 20 to be easily removed.

Thus, the AM-EWOD 100 is obtained.

Figure 10:
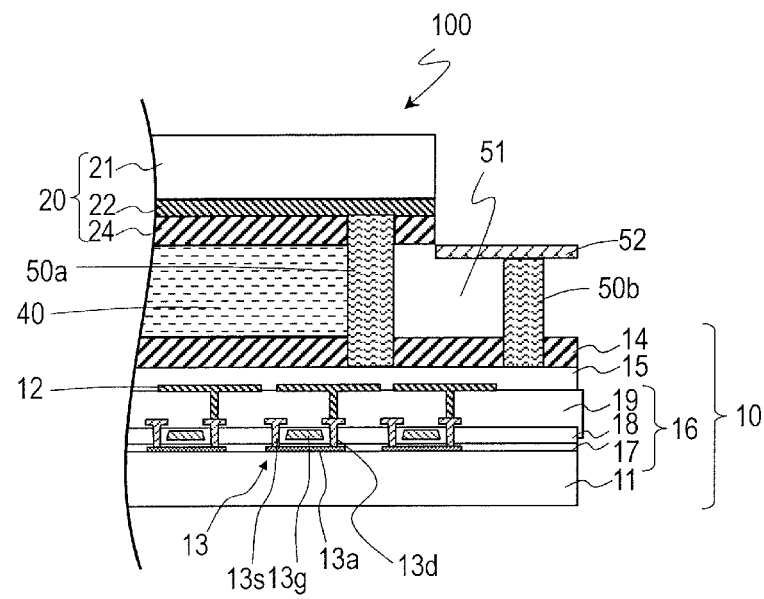
FIG. 10 is a perspective view schematically showing an overall configuration of an AM-EWOD 100 according to a second embodiment.

FIG. 10 is a perspective view schematically showing an overall configuration of the AM-EWOD 100. As shown in FIG. 10, the AM-EWOD 100 thus fabricated includes the separation film 52 covering the injection holes 51. Therefore, at least in the shipment of the product, all or a portion of the sealing member 50 located in the opening region 60a is covered by the separation film. As described above, at least the injection holes 51 and the sealing member 50 located in the opening region 60a are preferably entirely covered by the separation film 52. As a result, the entire opening region 60a can be protected by the separation film 52, and contaminants can be substantially prevented from adhering to the adhesive layer of the adhesive tape and entering from the injection holes 51.

The separation film 52 may, for example, be removed from the adhesive tape when a droplet 42 is injected through the injection holes 51. Until that process begins, the separation film 52 protects the entire opening region 60a.

Figure 11:
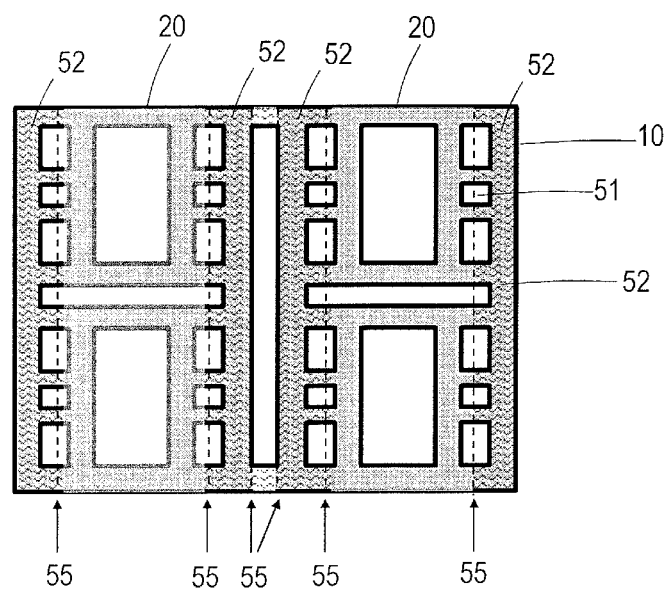
FIG. 11 is a schematic diagram for describing a state in which two large-sized substrates are attached together with separation films 52 interposed therebetween.

FIG. 11 is a schematic diagram for describing a state in which two large-sized substrates are attached together with separation films 52 interposed therebetween. The separation films 52 are provided along slit lines 55 so as to cover at least injection holes 51 and sealing members 50 in opening regions 60a. While the two large-sized substrates are kept attached together, the counter substrate 20 located in the opening regions can be removed at once. Alternatively, after singulation, in each device unit, the counter substrate 20 located in the opening region may be individually removed.

Embodiments of the present invention are widely applicable to electrowetting devices. An electrowetting device according to an embodiment of the present invention is suitably used in, for example, devices for biological analysis such as gene analysis, chemical reactions, etc.

The present application claims the benefit of U.S. Provisional Application No. 62/797,840 filed on Jan. 28, 2019, the disclosure of which is hereby incorporated by reference in its entirety.

What is claimed is:

1. A method for manufacturing an electrowetting device comprising:
   obtaining an electrode substrate by forming a plurality of first electrodes on a first substrate, forming a dielectric layer on the plurality of first electrodes, and forming a first hydrophobic layer on the dielectric layer;
   obtaining a counter substrate by forming a second electrode on a second substrate, and forming a second hydrophobic layer on the second electrode;
   drawing a pattern of a sealing material on at least one of the electrode substrate or the counter substrate to form an injection hole to inject a droplet into a gap formed between the first and second hydrophobic layers;
   attaching the electrode substrate and the counter substrate together by the sealing material so that the electrode substrate is opposite the counter substrate; and
   cutting and removing a portion of the counter substrate covering the sealing material from the sealing material, wherein
   in the obtaining the electrode substrate, the first hydrophobic layer is formed on the dielectric layer in a first hydrophobic film pattern including a first slit having a first line width,
   in the obtaining the counter substrate, the second hydrophobic layer is formed on the second electrode in a second hydrophobic film pattern including a second slit having a second line width smaller than the first line width,
   in the drawing a pattern of the sealing material, a pattern of the sealing material is drawn along at least one of the first slit of the electrode substrate or the second slit of the counter substrate,
   in the attaching the electrode substrate and the counter substrate together, the electrode substrate and the counter substrate are attached together so that the first slits cover the second slits as viewed from a normal direction of the counter substrate, and
   in the cutting and removing a portion of the counter substrate, a portion of the counter substrate is removed from the sealing material so that the injection hole is exposed.

2. The method according to claim 1, wherein the second line width is 1/10 or less of the first line width.

3. A method for manufacturing an electrowetting device comprising:
   obtaining an electrode substrate by forming a plurality of first electrodes on a first substrate, forming a dielectric layer on the plurality of first electrodes, and forming a first hydrophobic layer on the dielectric layer;
   obtaining a counter substrate by forming a second electrode on a second substrate, and forming a second hydrophobic layer on the second electrode;
   drawing a pattern of a sealing material on at least one of the electrode substrate or the counter substrate to form an injection hole to inject a droplet into a gap formed between the first and second hydrophobic layers;
   attaching the electrode substrate and the counter substrate together by the sealing material so that the electrode substrate is opposite the counter substrate; and
   cutting and removing a portion of the counter substrate covering the sealing material from the sealing material, wherein
   in the obtaining the electrode substrate, the first hydrophobic layer is formed on the dielectric layer in a first hydrophobic film pattern including a first slit,
   in the drawing a pattern of the sealing material, an adhesive tape is applied to the electrode substrate along the first slit, and thereafter, a portion of the adhesive tape including the injection hole is covered with a separation film,
   in the attaching the electrode substrate and the counter substrate together, the electrode substrate and the counter substrate are attached together with the separation film interposed therebetween, and
   in the cutting and removing a portion of the counter substrate, a portion of the counter substrate is removed from the sealing material so that the separation film is exposed.

* * * * *